(12) United States Patent
Dube

(10) Patent No.: US 10,822,200 B2
(45) Date of Patent: Nov. 3, 2020

(54) ELEVATOR SAFETY ACTUATOR SYSTEMS

(71) Applicant: Otis Elevator Company, Farmington, CT (US)

(72) Inventor: Randall S. Dube, Glastonbury, CT (US)

(73) Assignee: OTIS ELEVATOR COMPANY, Farmington, CT (US)

(*) Notice: Subject to any disclaimer, the term of this patent is extended or adjusted under 35 U.S.C. 154(b) by 287 days.

(21) Appl. No.: 16/158,629

(22) Filed: Oct. 12, 2018

(65) Prior Publication Data

US 2020/0115189 A1    Apr. 16, 2020

(51) Int. Cl.
  *B66B 5/20*  (2006.01)
  *B66D 5/30*  (2006.01)
  *F16D 63/00*  (2006.01)
  *F16D 65/28*  (2006.01)
  *F16D 121/20*  (2012.01)

(52) U.S. Cl.
  CPC .......... *B66B 5/20* (2013.01); *B66D 5/30* (2013.01); *F16D 63/002* (2013.01); *F16D 65/28* (2013.01); *F16D 2121/20* (2013.01)

(58) Field of Classification Search
  CPC .......... B66B 5/20; B66D 5/30; F16D 63/002; F16D 65/28; F16D 2121/20
  See application file for complete search history.

(56) References Cited

U.S. PATENT DOCUMENTS

| | | | | |
|---|---|---|---|---|
| 5,121,018 A | * | 6/1992 | Oldakowski | ............ F16D 55/02 188/161 |
| 5,467,850 A | * | 11/1995 | Skalski | .................... B66B 5/16 187/373 |

(Continued)

FOREIGN PATENT DOCUMENTS

| | | |
|---|---|---|
| EP | 2380838 B1 | 3/2013 |
| EP | 2837592 A1 | 2/2015 |

(Continued)

OTHER PUBLICATIONS

European Search Report for European Application No. 189202833.0, International Filing Date Oct. 11, 2019, dated Mar. 18, 2020, 6 pages.

*Primary Examiner* — Michael A Riegelman
(74) *Attorney, Agent, or Firm* — Cantor Colburn LLP

(57) ABSTRACT

Elevator systems are described that include a traveling component movable along a guide rail and an overspeed safety system. The safety system includes a safety brake connected to an electromechanical actuator. A safety brake element of the safety brake is operable to engage with the guide rail to stop the traveling component. The electromechanical actuator includes a frame, a first magnetic element operably connected to the safety brake, a second magnetic element movably attached to the frame, and a third magnetic element fixedly attached to the frame. The second magnetic element is movable to urge the first magnetic element from a first position toward a second position. In the second position, the first magnetic element is located proximate the third magnetic element. As the first magnetic element transitions from the first position to the second position, the safety brake element is actuated into engagement with the guide rail.

20 Claims, 10 Drawing Sheets

(56) References Cited

U.S. PATENT DOCUMENTS

| | | | | |
|---|---|---|---|---|
| 5,497,860 | A * | 3/1996 | Hendricks | F16D 55/28 188/161 |
| 5,628,385 | A * | 5/1997 | Yumura | B66B 5/044 187/373 |
| 6,173,813 | B1 * | 1/2001 | Rebillard | B66B 5/06 187/287 |
| 6,193,026 | B1 * | 2/2001 | Sevilleja | B60T 13/22 187/288 |
| 7,398,864 | B2 * | 7/2008 | Chida | B66B 5/0031 187/391 |
| 7,549,513 | B2 * | 6/2009 | Chida | B66B 5/0031 187/248 |
| 7,556,127 | B2 * | 7/2009 | Ohira | B66B 5/0031 187/391 |
| 7,575,099 | B2 * | 8/2009 | Oh | B66B 5/06 187/247 |
| 7,614,481 | B2 * | 11/2009 | Okamoto | B66B 5/06 187/305 |
| 7,667,356 | B2 * | 2/2010 | Togare | H02K 53/00 310/24 |
| 7,721,852 | B2 * | 5/2010 | Ishioka | B66B 7/08 187/391 |
| 8,573,365 | B2 * | 11/2013 | Ito | B66B 5/22 187/374 |
| 9,120,643 | B2 | 9/2015 | Meierhans et al. | |
| 9,376,295 | B2 * | 6/2016 | Piech | B66D 5/30 |
| 2007/0062763 | A1 * | 3/2007 | Shiratsuki | B66B 1/3492 187/394 |
| 2013/0081907 | A1 * | 4/2013 | Meierhans | B66B 5/20 187/359 |
| 2013/0081908 | A1 * | 4/2013 | Meierhans | B66B 5/18 187/359 |
| 2013/0248298 | A1 * | 9/2013 | Osmanbasic | B66B 5/20 187/359 |
| 2015/0129365 | A1 * | 5/2015 | Olkkonen | F16D 65/0006 187/250 |
| 2015/0345571 | A1 * | 12/2015 | Yi | F16D 27/14 188/164 |
| 2017/0073191 | A1 * | 3/2017 | Thumm | B66B 5/18 |
| 2018/0086599 | A1 * | 3/2018 | Hess | B66B 17/34 |
| 2019/0248628 | A1 * | 8/2019 | Dube | B66B 5/18 |
| 2020/0115189 | A1 * | 4/2020 | Dube | B66B 5/20 |

FOREIGN PATENT DOCUMENTS

| | | |
|---|---|---|
| EP | 3342741 A1 | 7/2018 |
| JP | H05147852 A | 6/1993 |
| JP | 2006131423 A | 5/2006 |
| WO | 03065397 A1 | 8/2003 |

* cited by examiner

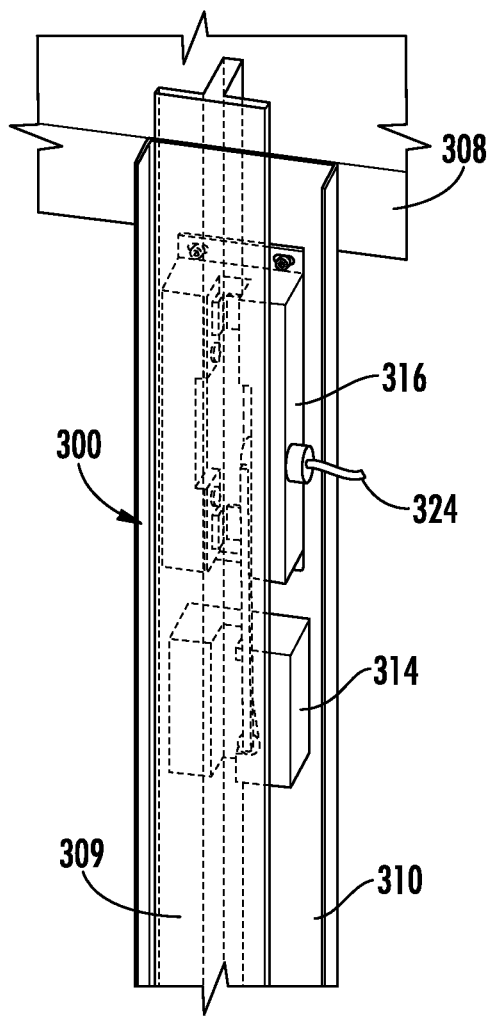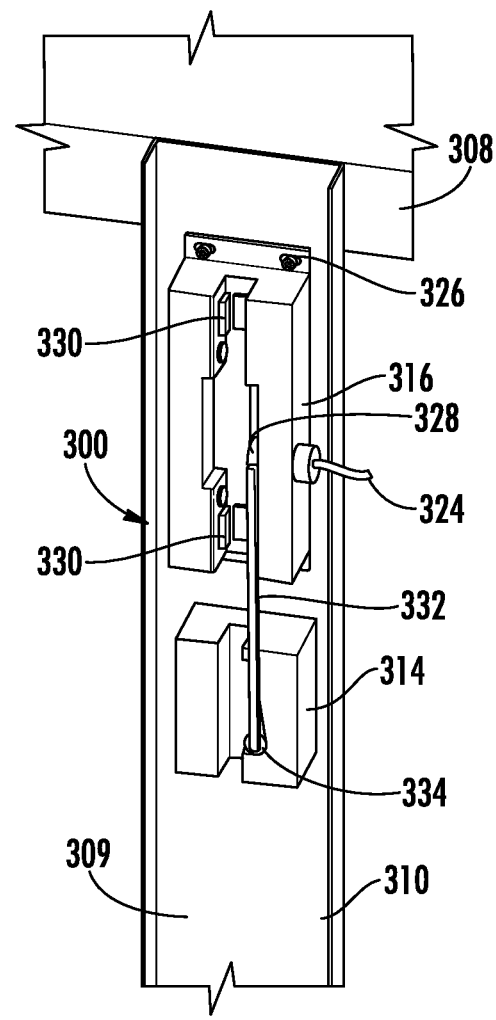
FIG. 3B
FIG. 3C

ELEVATOR SAFETY ACTUATOR SYSTEMS

BACKGROUND

The subject matter disclosed herein generally relates to elevator systems and, more particularly, to safety systems for elevators and control thereof in the event of overspeeding.

Typical elevator mechanical safety systems use governor overspeed systems coupled to a mechanical safety actuation module connected to safety brakes that activates in the event of a car overspeed event, car overacceleration event, or free fall—i.e., to stop an elevator car that is travelling too fast. Such safety actuation modules include a linking mechanism to engage two or more car safety brakes simultaneously (i.e., on both guide rails). The governor is located either in a machine room, in the hoistway, or may be mounted to the elevator car. The safety actuation module is typically made of a linkage that is located above the car or below the car platform—i.e., spanning the width of the elevator car to link opposing sides at the guide rails. However, recent developments have created electrical overspeed safety systems without typical linkages across the car for controlling operation of the elevator car during overspeed, overacceleration, free fall situations.

BRIEF SUMMARY

According to some embodiments, elevator systems are provided. The elevator systems include a traveling component movable along a guide rail within an elevator shaft and an overspeed safety system. The overspeed safety system includes a safety brake and an electromechanical actuator operably connected thereto, wherein a safety brake element of the safety brake is operable to engage with the guide rail to stop movement of the traveling component. The electromechanical actuator includes a frame mountable to the traveling component, a first magnetic element movably attached to the frame, the first magnetic element operably connected to the safety brake, a second magnetic element movably attached to the frame, and a third magnetic element fixedly attached to the frame. The second magnetic element is movable from a first position to a second position to urge the first magnetic element from a first position toward a second position, wherein in the second position, the first magnetic element is located proximate the third magnetic element, and wherein as the first magnetic element transitions from the first position to the second position, the safety brake element is actuated into engagement with the guide rail.

In addition to one or more of the features described above, or as an alternative, further embodiments may include that at least one the first magnetic element, the second magnetic element, and the third magnetic element is a permanent magnet.

In addition to one or more of the features described above, or as an alternative, further embodiments may include an actuator operably connected to the second magnetic element, wherein operation of the actuator causes the second magnetic element to transition from the first position to the second position.

In addition to one or more of the features described above, or as an alternative, further embodiments may include that the actuator includes a plunger and a biasing element, wherein the plunger is operably connected to the second magnetic element to urge the second magnetic element from the first position toward the second position and the biasing element is configured to urge the second magnetic element toward the first position from the first position.

In addition to one or more of the features described above, or as an alternative, further embodiments may include a rotating arm, wherein the second magnetic element is attached to the rotating arm, wherein rotation of the rotating arm causes the second magnetic element to transition between the first position and the second position.

In addition to one or more of the features described above, or as an alternative, further embodiments may include that the rotating arm is moveable through a stroke angle $\alpha$.

In addition to one or more of the features described above, or as an alternative, further embodiments may include that the stroke angle $\alpha$ is between 10° and 60°.

In addition to one or more of the features described above, or as an alternative, further embodiments may include a support element, the support element arrange to support the second magnetic element in the first position, wherein in the first position the rotating arm contacts the support element.

In addition to one or more of the features described above, or as an alternative, further embodiments may include that the support element is integral with the frame.

In addition to one or more of the features described above, or as an alternative, further embodiments may include one or more guides within the frame, wherein the first magnetic element is moveable along the one or more guides during transition between the first position and the second position.

In addition to one or more of the features described above, or as an alternative, further embodiments may include that second magnetic element is translatable between the first and second positions.

In addition to one or more of the features described above, or as an alternative, further embodiments may include a connecting link fixedly connecting the first magnetic element to the safety brake element.

In addition to one or more of the features described above, or as an alternative, further embodiments may include that the traveling component is an elevator car.

In addition to one or more of the features described above, or as an alternative, further embodiments may include that the traveling component is a counterweight.

In addition to one or more of the features described above, or as an alternative, further embodiments may include that the frame includes a stop, the stop arranged to support the first magnetic element when in the first position.

In addition to one or more of the features described above, or as an alternative, further embodiments may include that at least one of the first magnetic element, the second magnetic element, and the third magnetic element is housed within a respective housing, wherein the respective housing is configured to mount a respective magnetic element to the frame.

In addition to one or more of the features described above, or as an alternative, further embodiments may include that when in the first position of the first magnetic element, the first magnetic element is separated from the third magnetic element by a separation distance $S_d$, and when in the second position of the first magnetic element, the first magnetic element is separate from the third magnetic element by an allowance gap $G_a$ that is less than the separation distance $S_d$.

In addition to one or more of the features described above, or as an alternative, further embodiments may include that, when the second magnetic element is in the second position, a repulsive magnetic force is generated between the first magnetic element and the second magnetic element to urge the first magnetic element toward the third magnetic element.

In addition to one or more of the features described above, or as an alternative, further embodiments may include that, when the first magnetic element is in the second position, an attractive magnetic force is generated between the first magnetic element and the third magnetic element to urge the first magnetic element toward the third magnetic element.

In addition to one or more of the features described above, or as an alternative, further embodiments may include that the safety brake comprises one or more safety brake elements configured to engage with the guide rail when the first magnetic element is transition toward the second position.

The foregoing features and elements may be combined in various combinations without exclusivity, unless expressly indicated otherwise. These features and elements as well as the operation thereof will become more apparent in light of the following description and the accompanying drawings. It should be understood, however, that the following description and drawings are intended to be illustrative and explanatory in nature and non-limiting.

BRIEF DESCRIPTION OF THE DRAWINGS

The present disclosure is illustrated by way of example and not limited by the accompanying figures in which like reference numerals indicate similar elements.

FIG. 3B is an enlarged illustrative view of a portion of the overspeed safety system of FIG. 3A;

FIG. 3C is the same view as FIG. 3B, but with a guide rail removed for clarity;

DETAILED DESCRIPTION

Figure 1:
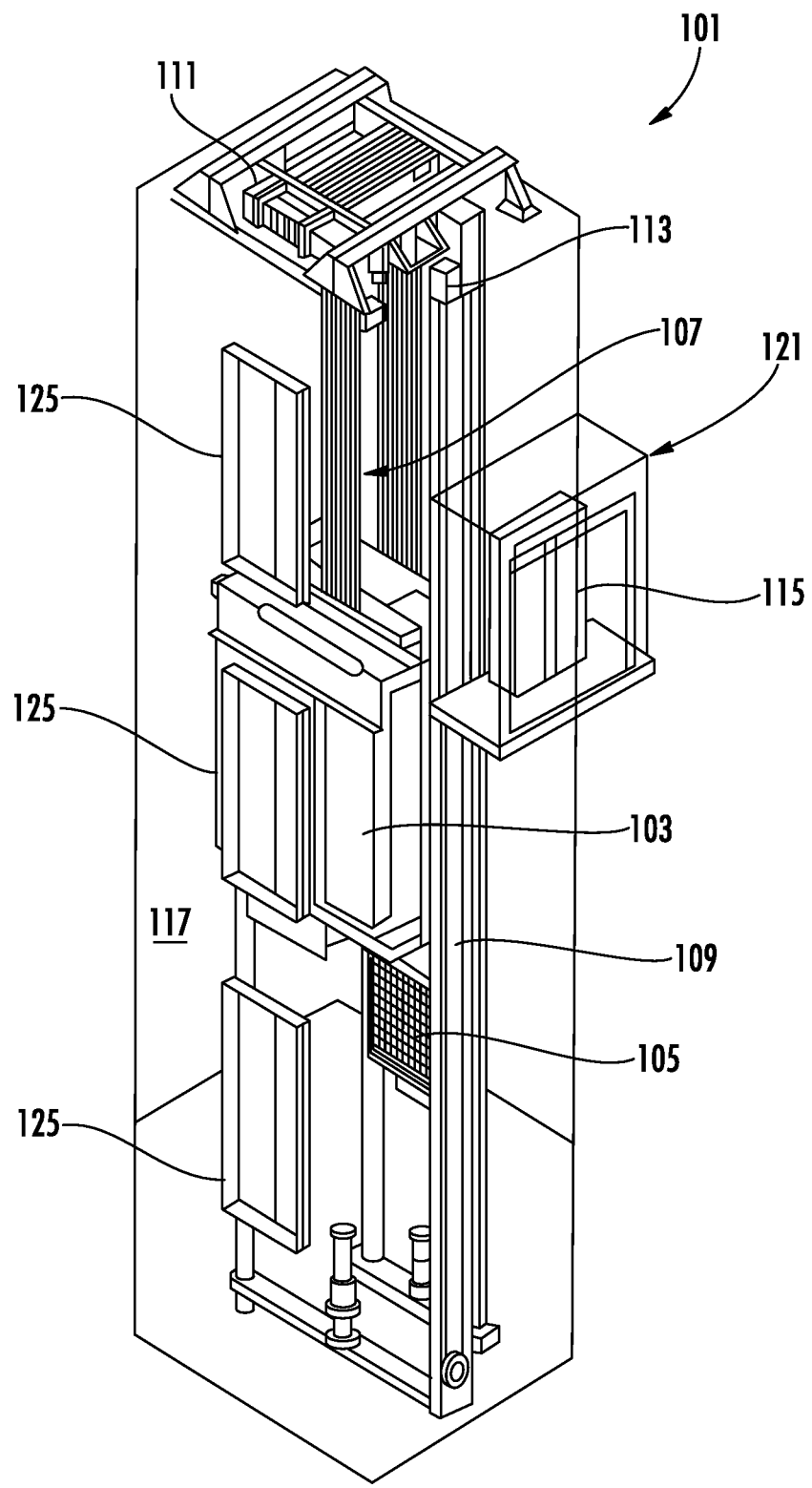
FIG. 1 is a schematic illustration of an elevator system that may employ various embodiments of the present disclosure.

FIG. 1 is a perspective view of an elevator system 101 including an elevator car 103, a counterweight 105, a tension member 107, a guide rail 109, a machine 111, a position reference system 113, and an elevator controller 115. The elevator car 103 and counterweight 105 are connected to each other by the tension member 107. The tension member 107 may include or be configured as, for example, ropes, steel cables, and/or coated-steel belts. The counterweight 105 is configured to balance a load of the elevator car 103 and passengers and is configured to facilitate movement of the elevator car 103 concurrently and in an opposite direction with respect to the counterweight 105 within an elevator shaft 117 and along the guide rail 109. As used herein, the term "traveling component" refers to either of the elevator car 103 or the counterweight 105.

The tension member 107 engages the machine 111, which is part of an overhead structure of the elevator system 101. The machine 111 is configured to control movement between the elevator car 103 and the counterweight 105. The position reference system 113 may be mounted on a fixed part at the top of the elevator shaft 117, such as on a support or guide rail, and may be configured to provide position signals related to a position of the elevator car 103 within the elevator shaft 117. In other embodiments, the position reference system 113 may be directly mounted to a moving component of the machine 111, or may be located in other positions and/or configurations as known in the art. The position reference system 113 can be any device or mechanism for monitoring a position of an elevator car and/or counter-weight, as known in the art. For example, without limitation, the position reference system 113 can be an encoder, sensor, or other system and can include velocity sensing, absolute position sensing, etc., as will be appreciated by those of skill in the art.

The elevator controller 115 is located, as shown, in a controller room 121 of the elevator shaft 117 and is configured to control the operation of the elevator system 101, and particularly the elevator car 103. For example, the elevator controller 115 may provide drive signals to the machine 111 to control the acceleration, deceleration, leveling, stopping, etc. of the elevator car 103. The elevator controller 115 may also be configured to receive position signals from the position reference system 113 or any other desired position reference device. When moving up or down within the elevator shaft 117 along guide rail 109, the elevator car 103 may stop at one or more landings 125 as controlled by the elevator controller 115. Although shown in a controller room 121, those of skill in the art will appreciate that the elevator controller 115 can be located and/or configured in other locations or positions within the elevator system 101. In one embodiment, the controller may be located remotely or in the cloud.

The machine 111 may include a motor or similar driving mechanism. In accordance with embodiments of the disclosure, the machine 111 is configured to include an electrically driven motor. The power supply for the motor may be any power source, including a power grid, which, in combination with other components, is supplied to the motor. The machine 111 may include a traction sheave that imparts force to tension member 107 to move the elevator car 103 within elevator shaft 117.

Although shown and described with a roping system including tension member 107, elevator systems that employ other methods and mechanisms of moving an elevator car within an elevator shaft may employ embodiments of the present disclosure. For example, embodiments may be employed in ropeless elevator systems using a linear motor to impart motion to an elevator car. Embodiments may also be employed in ropeless elevator systems using a hydraulic lift to impart motion to an elevator car. FIG. 1 is merely a non-limiting example presented for illustrative and explanatory purposes.

Figure 2:
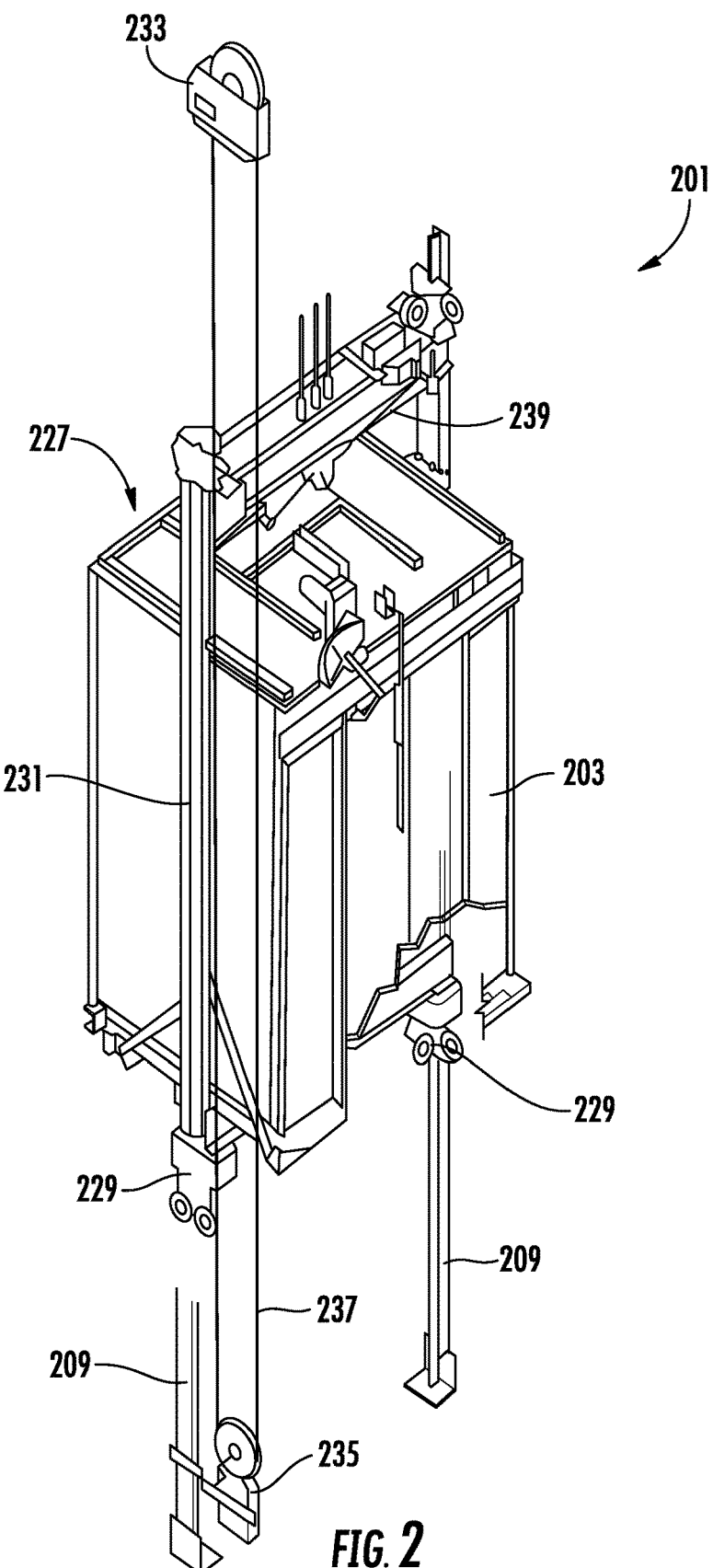
FIG. 2 is a prior art arrangement of an overspeed safety system for elevators.

Turning to FIG. 2, a schematic illustration of a prior elevator car overspeed safety system 227 of an elevator system 201 is shown. The elevator system 201 includes an elevator car 203 that is movable within an elevator shaft along guide rails 209. In this illustrative embodiment, the overspeed safety system 227 includes a pair of braking elements 229 that are engageable with the guide rails 209. The braking elements 229 are actuated, in part, by operation of lift rods 231. The triggering of the braking elements 229 is achieved through a governor 233, typically located at the top of the elevator shaft, which includes a tension device 235 located within the pit of the elevator shaft with a cable 237 operably connecting the governor 233 and the tension device 235. When an overspeed event is detected by the governor, the overspeed safety system 227 is triggered, and a linkage 239 is operated to actuate both lift rods 231 simultaneously such that a smooth and even stopping or braking force is applied to stop the travel of the elevator car. The linkage 239, as shown, is located on the top of the elevator car 203. However, in other configurations, the linkage may be located below a platform (or bottom) of the elevator car. As shown, various components are located above and/or below the elevator car 203.

Figure 3A:
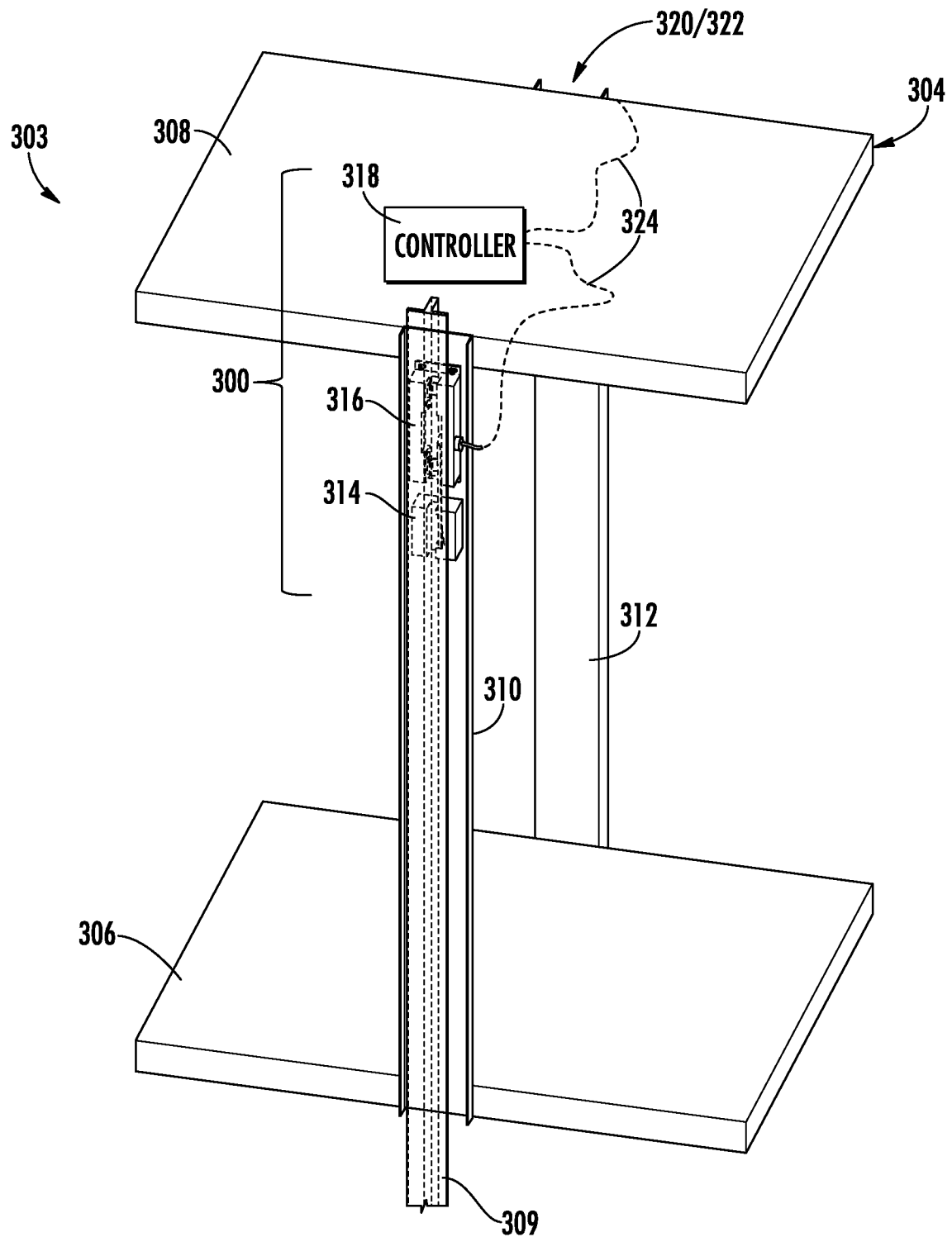
FIG. 3A is an isometric illustration of an elevator car frame having an overspeed safety system that may incorporate an embodiment of the present disclosure.

Turning now to FIGS. 3A-3C, schematic illustrations of an elevator car 303 having an overspeed safety system 300 in accordance with an embodiment of the present disclosure are shown. FIG. 3A is an isometric illustration of an elevator car frame 304 with the overspeed safety system 300 installed thereto. FIG. 3B is an enlarged illustration of a portion of the overspeed safety system 300 showing a relationship with a guide rail. FIG. 3C is a schematic similar to FIG. 3B, but with the guide rail removed for clarity of illustration.

The car frame 304 includes a platform 306, a ceiling 308, a first car structural member 310, and a second car structural member 312. The car frame 304 defines a frame for supporting various panels and other components that define the elevator car for passenger or other use (i.e., define a cab of the elevator), although such panels and other components are omitted for clarity of illustration. The elevator car 303 is moveable along guide rails 309, similar to that shown and described above. The overspeed safety system 300 provides a safety braking system that can stop the travel of the elevator car 303 during an overspeed event.

The overspeed safety system 300 includes a first safety brake 314, a first electromechanical actuator 316, and a control system or safety system controller 318 operably connected to the first electromechanical actuator 316. The first safety brake 314 and the first electromechanical actuator 316 are arranged along the first car structural member 310. A second safety brake 320 and a second electromechanical actuator 322 are arranged along the second car structural member 312. The safety system controller 318 is also operably connected to the second electromechanical actuator 322. The connection between the safety system controller 318 and the electromechanical actuators 316, 322 may be provided by a communication line 324. The communication line 324 may be wired or wireless, or a combination thereof (e.g., for redundancy). As shown, the safety system controller 318 is located on the top or ceiling 308 of the car frame 304. However, such position is not to be limiting, and the safety system controller 318 may be located anywhere within the elevator system (e.g., on or in the elevator car, within a controller room, etc.). The safety system controller 318 may comprise electronics and printed circuit boards for processing (e.g., processor, memory, communication elements, electrical buss, etc.). Thus, the safety system controller 318 may have a very low profile and may be installed within ceiling panels, wall panels, or even within a car operating panel of the elevator car 303.

The overspeed safety system 300 is an electromechanical system that eliminates the need for a linkage or linking element installed at the top or bottom of the elevator car. The safety system controller 318 may include, for example, a printed circuit board with multiple inputs and outputs. In some embodiments, the safety system controller 318 may include circuitry for a system for control, protection, and/or monitoring based on one or more programmable electronic devices (e.g., power supplies, sensors, and other input devices, data highways and other communication paths, and actuators and other output devices, etc.). The safety system controller 318 may further include various components to enable control in the event of a power outage (e.g., capacitor/battery, etc.). The safety system controller 318 may also include an accelerometer and/or absolute position reference system to determine a speed and/or acceleration of an elevator car. In such embodiments, the safety system controller 318 is mounted to the elevator car, as shown in the illustrative embodiments herein.

The safety system controller 318, in some embodiments, may be connected to and/or in communication with a car positioning system, an accelerometer mounted to the car (i.e., a second or separate accelerometer), and/or to the elevator controller. Accordingly, the safety system controller 318 may obtain movement information (e.g., speed, direction, acceleration) related to movement of the elevator car along an elevator shaft. The safety system controller 318 may operate as part of and/or independently of other systems, other than potentially receiving movement information, to provide a safety feature to prevent overspeed events.

The safety system controller 318 may process the movement information provided by a car positioning system to determine if an elevator car is over speeding beyond a certain threshold or accelerating beyond a threshold. If the threshold is exceeded, the safety system controller 318 will trigger the electromechanical actuators and the safety brakes. The safety system controller 318 will also provide feedback to the elevator control system about the status of the overspeed safety system 300 (e.g., normal operational position/triggered position).

Although FIG. 3 is illustratively shown with respect to an elevator car, the configuration of the overspeed safety system may be similar to any traveling component (e.g., counterweight). The overspeed safety system 300 of the present disclosure enables electrical and electromechanical safety braking in the event of overspeed, overacceleration, and/or free fall events (hereinafter "triggering events"). The electrical aspects of the present disclosure enable the elimination of the physical/mechanical linkages that have traditionally been employed in overspeed safety systems. That is, the electrical connections allow for simultaneous triggering of two separate safety brakes through electrical signals, rather than relying upon mechanical connections.

With reference to FIG. 3C, details of parts of the overspeed safety system 300 are shown. The first electromechanical actuator 316 is mounted to the first car structural member 310 using one or more fasteners 326 (e.g., floating fasteners). The electromechanical actuator may be mounted above or below a safety brake, via an additional bracket, as will be appreciated by those of skill in the art. The first electromechanical actuator 316 includes an actuator element 328 and guidance elements 330. The first electromechanical actuator 316 is operably connected to the safety system controller 318 by the communication line 324. The safety system controller 318 can transmit an actuation signal to the first electromechanical actuator 316 (and the second electromechanical actuator 322) to perform an actuation operation when a triggering event is detected. The first electromechanical actuator 316 will actuate a connecting link 332 that is operably connected to the first safety brake 314. When the connecting link 332 is actuated, the first safety brake 314 will actuate to engage with the guide rail 309, e.g., using a safety brake element 334, such as a safety roller or wedge. In some embodiments, the safety brake and the electromechanical actuator may be combined into a single assembly, and the present illustration and description is provided for example and explanation only, and is not intended to be limiting.

Figure 4:
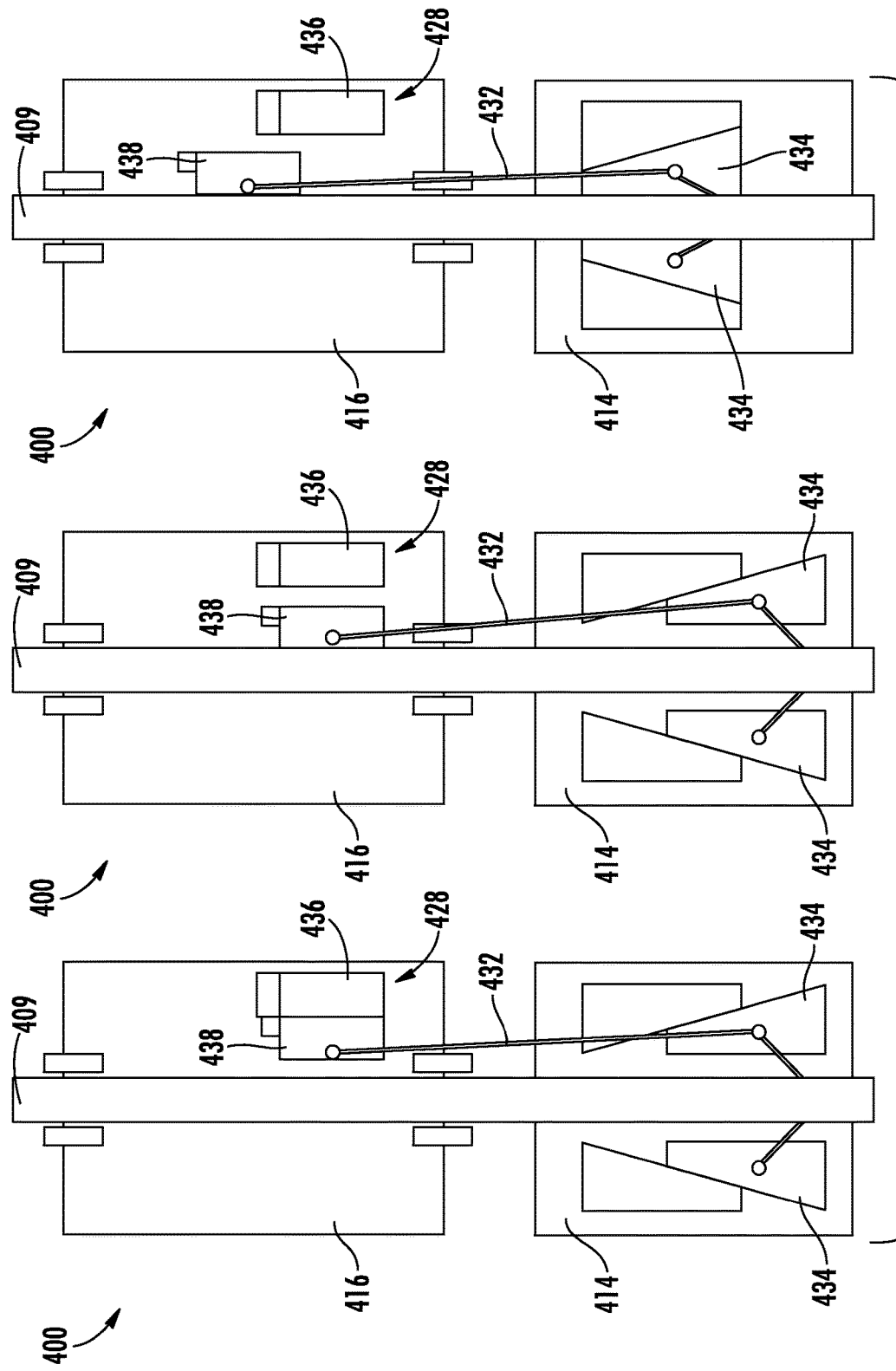
FIG. 4 is a series of illustrations depicting operation of a portion of an overspeed safety system in accordance with an electromagnetic overspeed safety system.

Turning now to FIG. 4, an illustrative sequence of operation of a portion of a typical overspeed safety system 400 is shown. The overspeed safety system 400 may be similar to that described above, and operable as described above. The overspeed safety system 400 includes an electromechanical actuator 416 and a safety brake 414 connected by a connecting link 432. The overspeed safety system 400 may be mounted to or otherwise attached to a traveling component (e.g., elevator car or counterweight). The safety brake 414 is arranged about a guide rail 409 and is configured to operably engage with the guide rail 409 to apply a braking force to a traveling component to which the overspeed safety system 400 is a part. The safety brake 414 includes safety brake elements 434 (e.g., brake pads, wedges, etc.) that are operable to engage with the guide rail 409. The electromechanical actuator 416 includes an actuator element 428 that is, in part, connected to the connecting link 432 to actuate the safety brake elements 434.

In this illustrative embodiment, the actuator element 428 includes a first magnetic element 436 and a second magnetic element 438. The first magnetic element 436 may be an electromagnet (e.g., a coil) that generates a magnetic field to provide engagement with the second magnetic element 438. The second magnetic element 438 may be a permanent magnet. The states of the first and second magnetic elements 436, 438 are bi-stable and a current pulse is sent through the first magnetic element 436 for transitions between the first (left image of FIG. 4) and second (middle image of FIG. 4) states of the actuator element 428. The current polarity is used to control the direction of transition (i.e., first-to-second, or second-to-first). The above described operation is merely provided as example, and other arrangements are possible without departing from the scope of the present disclosure. In some embodiments, an electrical current may be provided to the first magnetic element to generate a repulsive magnetic field, and thus urge the second magnetic element away therefrom.

When the magnetic field of the first magnetic element 436 ceases to be generated, the second magnetic element 438 is moved into contact with and magnetically attaches to the guide rail 409, as shown in the middle image of FIG. 4 (second state). That is, because the first magnetic element 436 is no longer magnetized (e.g., no current flowing through a coil), the second magnetic element 438 will be attracted to the metal of the guide rail 409 and magnetically adhere thereto. Accordingly, when no electrical power is supplied to the first magnetic element 436, the second magnetic element 438 will automatically engage with the guide rail 409.

The second state, shown in the middle image of FIG. 4, exists when the traveling component is stationary. However, if the traveling component travels downward, because the second magnetic element 438 is engaged with the guide rail 409, the second magnetic element 438 will apply a force to the connecting link 432 to urge the safety brake elements 434 into engagement with the guide rail 409 (third state, shown in right image of FIG. 4). With the safety brake elements 434 engaged with the guide rail 409, the traveling component may be prevented from further downward movement.

As described above, such overspeed safety systems may rely upon magnetic interaction (or electromagnetic interaction) to drive the connecting link, and thus to perform engagement of the safety brake elements with the guide rail. That is, engaging the safety brakes is achieved by using an electromagnet to deploy a permanent magnet to the guide rail and relying on the magnetic normal force and sliding friction resistance of the permanent magnet to create the lifting force to move the safety wedge. A resetting force for the permanent magnet (e.g., back to engagement with the electromagnet) may be high and can impact reliability rates.

In accordance with embodiments of the present disclosure, overspeed safety systems are provided that employ the use of an actuator (e.g., push solenoid, pull solenoid, mechanical actuator, plunger actuator, piston, etc.) to cause movement or stroke (e.g., rotation) of a permanent magnet to cause movement of other magnets in order to trigger operation of the braking mechanism.

For example, in one non-limiting example, in accordance with an embodiment of the present disclosure, direct safety braking element(s) actuation is achieved by using an actuator of limited stroke to rotate a permanent magnet to repel a guided and moveable permanent magnet. The moveable permanent magnet may be, in some embodiments, attracted to a stationary permanent magnet or electromagnet. By arranging the magnetic polarization of the various permanent magnets, a desired behavior may be ensured. The combination of repelling and attractive forces operating on the movable permanent magnet can accelerates it upward. A connecting link may be affixed to the movable permanent magnet, and thus movement of the movable permanent magnet will cause movement of the safety braking element(s) to engage with a guide rail to apply a braking force. The position of one or more of the permanent or electromagnets (e.g., fixed magnets) may be based on a maximum travel distance of the safety braking element(s).

In various embodiments, the sizes of the permanent or electromagnets and the positions thereof may be set to minimize the time for the safety braking element(s) to engage with the guide rail. In one non-limiting example, a short, high current DC pulse can energize an actuator (e.g., a solenoid) in the event of a car overspeed fault being detected by a speed sensing device (e.g. governor). In accordance with some embodiments, the resetting of the overspeed safety systems may be achieved by the conventional process of running the elevator car upward, which drives the safety braking element(s) (and the connected permanent magnet) downward with a force easily overcoming the attractive force between multiple of the permanent or electromagnets of the overspeed safety systems, as described herein.

Figure 5A:
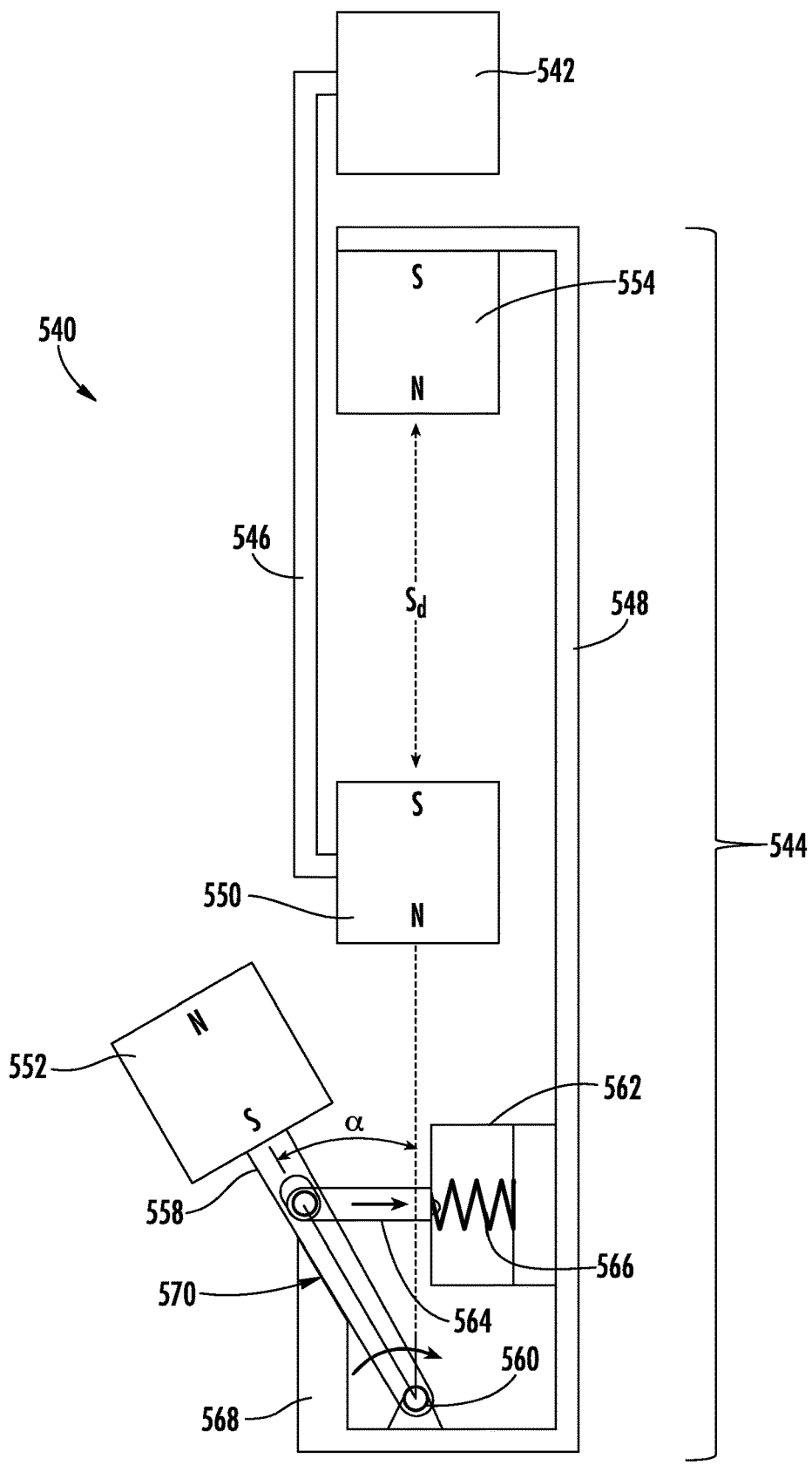
FIG. 5A is a schematic illustration of an overspeed safety system in accordance with an embodiment of the present disclosure, shown in a first state.
Figure 5B:
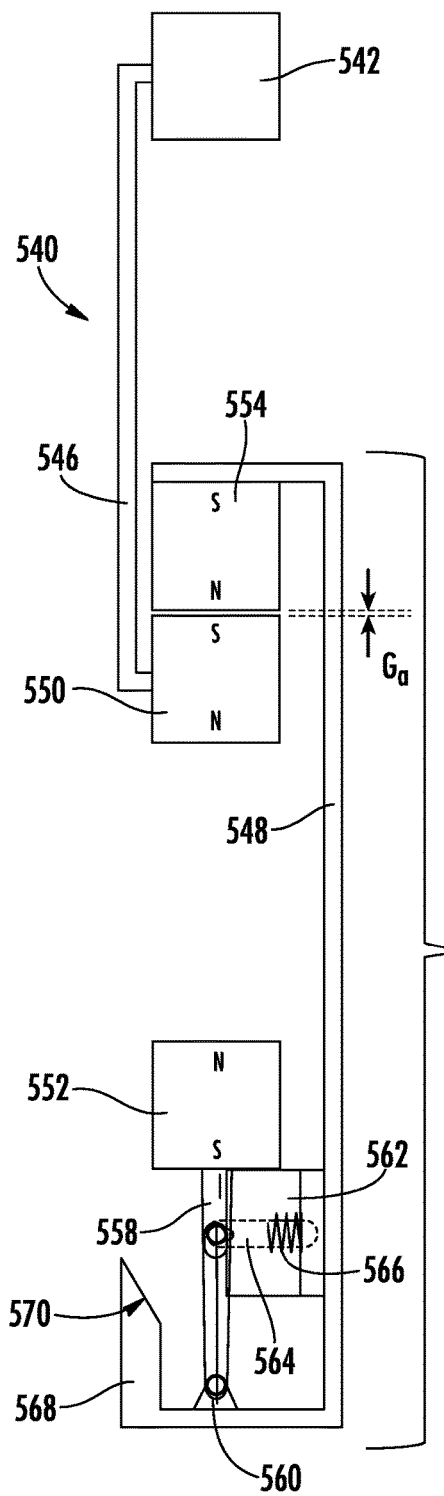
FIG. 5B is a schematic illustration of the overspeed safety system of FIG. 5A, shown in a second state.
Figure 5C:
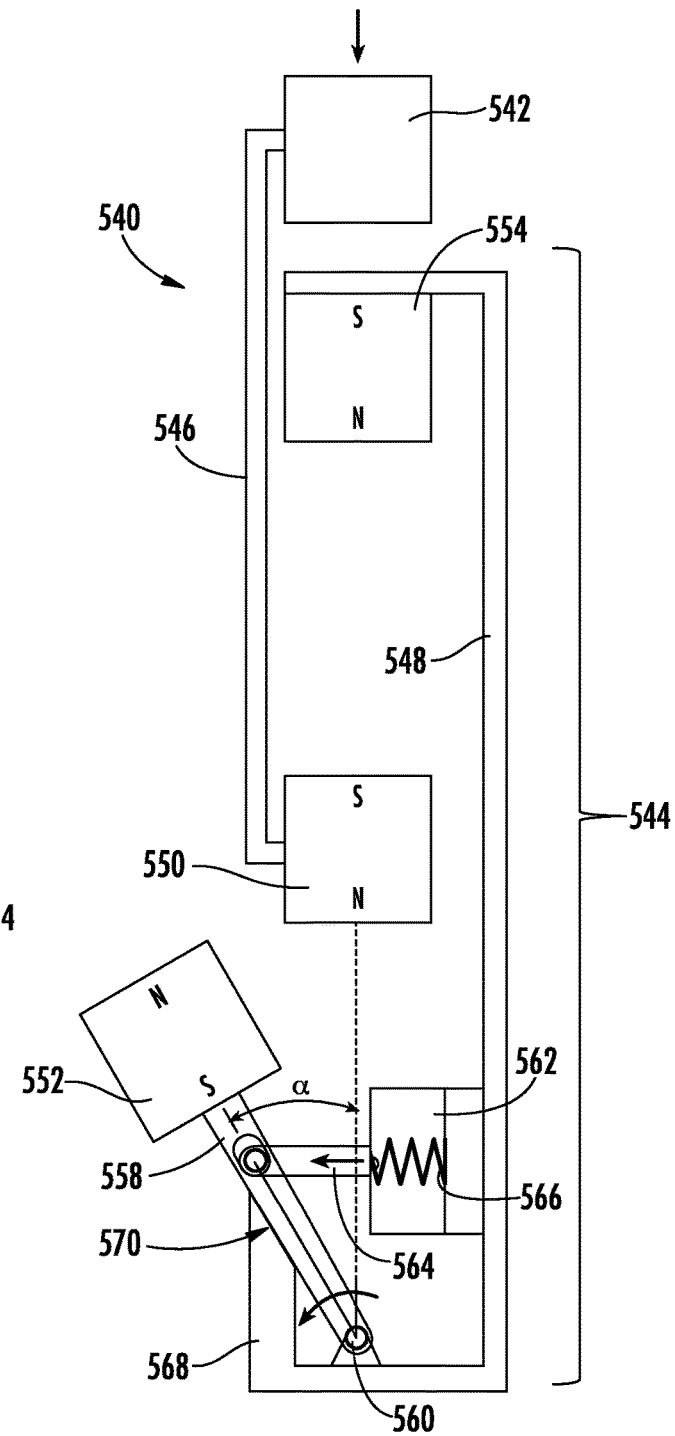
FIG. 5C is a schematic illustration of the overspeed safety system illustrating a transition from the second state to the first state.

Turning now to FIGS. 5A-5C, schematic illustrations of an overspeed safety system 540 in accordance with an embodiment of the present disclosure are shown. The overspeed safety system 540 may be mounted to a traveling component (e.g., an elevator car or counterweight) of an elevator system, as described above. The overspeed safety system 540 includes various features that are similar to that described above, and thus similar features may not be described again and/or shown for simplicity and/or clarity. The overspeed safety system 540 may be an electrically actuated system.

The overspeed safety system 540 includes a safety brake with safety brake element(s) 542 that is operably connected to an electromechanical actuator 544, with the safety brake elements(s) 542 operably connected to the electromechanical actuator 544 by a connecting link 546. The safety brake element(s) 542 may be configured as shown and described above, having one or more safety brake elements that are engageable with a guide rail to apply a braking force to stop downward movement of a traveling component.

As shown in FIG. 5A, the overspeed safety system 540 includes a frame 548 that houses a first magnetic element 550, a second magnetic element 552, and a third magnetic element 554. Each of the magnetic elements 550, 552, 554 may be a permanent magnet or an electromagnet. The first magnetic element 550 is connected to or attached to the connecting link 546, and thus operably connected to the safety brake element(s) 542. The first magnetic element 550 is moveable between a first position (shown in FIG. 5A) and a second position (shown in FIG. 5B). The first magnetic element 550 moves within the frame 548. For example, in some embodiments, when installed to a traveling component of an elevator system, the first magnetic element 550 may be movable vertically from the first position to the second position, as described herein.

The second magnetic element 552 is affixed or mounted to a rotating arm 558, with the rotating arm 558 pivotable about a pivot 560. The pivot 560, in this illustrative embodiment, is mounted to a portion of the frame 548. The rotating arm 558 is operably connected to an actuator 562 (e.g., push or pull solenoid). The actuator 562 is operable to cause rotational movement of the rotating arm 558 through a stroke angle α. In a first position, shown in FIG. 5A, the second magnetic element 552 is located away from the first magnetic element 550 such that the magnetic fields of the first and second magnetic elements 550, 552 do not interact substantially to cause movement of the first magnetic element 550. In operation, the rotating arm 558 may be urged to move through the stroke angle α, and thus position the second magnetic element 552 in proximity to the first magnetic element 550, such that the magnetic field interaction of the first magnetic element 550 with the second magnetic element 552 causes the first magnetic element 550 to move away from (repulsed) the second magnetic element 552. That is, the first and second magnetic elements 550, 552 are arranged such that similar poles of the magnetic fields are aligned to generate a repulsive force between the first and second magnetic elements. It will be appreciated by those of skill in the art that that magnetic elements may have other magnetic pole arrangements not shown, e.g. N-S/S-N (i.e., horizontal), or otherwise arranged/oriented. The specific magnetic pole arrangements illustratively shown are merely for explanatory purposes and are not intended to be limiting.

The actuator 562 is operably connected to the rotating arm 558 by a plunger 564. The plunger 564 is moveable by actuation or operation of the actuator 562 such that the plunger 564 pulls on and urges the rotating arm 558 to pivot about the pivot 560 and move the second magnetic element from the first position (FIG. 5A) to the second position (FIG. 5B). As shown, the actuator 562 may include a biasing element 566 configured to provide a biasing force from the second position toward the first position. The biasing element 566 may be a spring, a hydraulic mechanism, a pneumatic mechanism, a magnetic mechanism, etc., as will be appreciated by those of skill in the art. That is, the term "biasing" as used for the biasing element 566 means a force or mechanism to urge from the second position toward the first position (attractive or repulsive; compressive or tensional; etc.). Accordingly, in this embodiment, the actuator 562 is configured to apply a pulling force on the plunger 564 to overcome the biasing force of the biasing element 566 when operating the overspeed safety system 540. It will be appreciated by those of skill in the art that the reverse of the above description may be true, without departing from the scope of the present disclosure. That is, the biasing element 566 may be configured to pull the second magnetic element 552 toward the activation positions, and the actuator pushes it away. In such configuration, if power is lost, the safety actuation will occur.

In this illustrative embodiment, the frame 548 includes a support element 568 that includes an angled surface 570 that is arranged to support the rotating arm 558 (and the second magnetic element 552) when the second magnetic element 552 is in the first position. The angled surface 570 is angled at the stroke angle α to support and hold the second magnetic element 552 in the first position. In some embodiments, the angled surface 570 may be part of a separate element or structure and thus may be independent of the support element 568.

In the first position, the first magnetic element 550 is also spaced from the third magnetic element 554 by a separation distance $S_d$. The separation distance $S_d$ is set such that in the first position of the first magnetic element 550, the magnetic fields of the first magnetic element 550 and the third magnetic element 554 do not interact substantially to cause movement of the first magnetic element 550. The third magnetic element 554 is fixed mounted or positioned within the frame 548. The pole of the third magnetic element 554 is configured such that it is the opposite of the first magnetic element 550. As such, if the first magnetic element 550 approaches or moves into proximity of the third magnetic element 554, an attractive magnetic force will be generated, thus urging the first magnetic element 550 toward the third magnetic element 554.

Turning now to FIG. 5B, the overspeed safety system 540 is shown in the actuated position, with the first and second magnetic elements 550, 552 in the second positions. As shown, the plunger 564 of the actuator 562 has been pulled inward to cause the rotating arm 558 to rotate about the pivot 560 through the stroke angle α. The second magnetic element 552 is arranged such that it is aligned with the first magnetic element 550, and with the poles configured as noted above, a repulsive magnetic force has urged the first magnetic element 550 away from the second magnetic element 552.

As the first magnetic element 550 is moved through the separation distance $S_d$, and away from the second magnetic element 552, the magnetic fields of the first and third magnetic elements 550, 554 will interact. Because of the orientation of the poles of the first and third magnetic elements 550, 554, an attractive force will be generated, and the third magnetic element 554 will cause the first magnetic element 550 to continue to move toward the third magnetic element 554, and into the second position, as shown in FIG. 5B.

As the first magnetic element 550 moves from the first position (FIG. 5A) to the second position (FIG. 5B), the first magnetic element 550 will cause the connecting link 546 to move as well. As the connecting link 546 is moved, the safety brake element(s) 542 will also be moved. When the first magnetic element 550 is moved into the second position the safety brake element(s) 542 of the safety brake will contact the guide rail (see, e.g., right side illustration of FIG. 4). With the safety brake elements in contact with the guide rail, any downward movement of the traveling component will cause the safety brake elements to apply a braking or stopping force through engagement with the guide rail.

It is noted that the repelling force generated by the interaction between the first magnetic element 550 and the second magnetic element 552 is sufficient to overcome the force of gravity applied to the mass of the first magnetic element 550, the connecting link 546, and the safety brake element(s) 542. Further, depending on the arrangement of the first magnetic element 550 within the frame 548, additional frictional forces, etc., may be present, such as forcing movement through or along a guiding track within the frame 548. In one non-limiting example, the stroke angle α may be between 10° and 60°, and in some embodiments may be about 15°. It is noted that the length of the rotating arm 558 and the stroke angle α may be selected to ensure a fast or quick transition from the first position (FIG. 5A) to the second position (FIG. 5B) to ensure an efficient safety operation for braking in the event of an overspeed event. Further, in some embodiments, the actuator 562 may only be powered during an overspeed event or during a diagnostic/maintenance check. That is, the power supplied to the actuator 562 may be provided only when needed, and a lack of power may be the rest state or normal operation. However, in some embodiment, the opposite may be true, such that the actuator is constantly powered, and a lack or loss of power may trigger operation of the overspeed safety system 540.

After operation of the overspeed safety system 540, e.g., in the event of an overspeed event, the overspeed safety system 540 will need to be reset. Resetting the overspeed safety system 540 may be achieved through upward movement of the traveling component, which will cause a downward force to be applied to the safety brake element(s) 542, as shown in FIG. 5C. When the downward movement of the safety brake element(s) 542 releases or disengages contact of the safety brake elements from the guide rail, the force of gravity will cause the safety brake element(s) 542, the connecting link 546, and the first magnetic element 550 to move downward. That is, the first magnetic element 550 is moved away from the third magnetic element 554. Additionally, if the third magnetic element 554 is an electromagnet, a current direction or polarity may be reversed to provide a supplemental driving force upon the first magnetic element 550 to drive the first magnetic element 550 downward. At the same time, or prior to the traveling component movement, the actuator 562 and/or the biasing element 566 thereof, may urge the plunger 564 to force the rotating arm 558 from the second position toward the first position.

Turning again to FIG. 5B, in some embodiments, when the first magnetic element 550 is in the second position, an allowance gap $G_a$ is present between the first magnetic element 550 and the third magnetic element 554. The allowance gap $G_a$ provides for an allowance of additional movement of the safety brake element(s) 542. The allowance gap $G_a$ is formed when the first magnetic element 550 is moved toward the third magnetic element 554 and the contact of the safety brake element(s) 542 with the guide rail causes the movement thereof to stop.

Direct actuation of the overspeed safety system 540 is achieved by operation of the actuator causing rotation of the second magnetic element 552. As the second magnetic element 552 is rotated through the stroke angle α, the second magnetic element 552 repels the moveable first magnetic element 550. The moveable first magnetic element 552 is attracted to the stationary third magnetic element 554, when within a pre-defined range. By arranging the magnetic polarization of the magnetic elements 550, 552, 554, the described behavior may be achieved (e.g., transition from the first position (FIG. 5A) to the second position (FIG. 5B) and back). The combination of repelling and attractive forces operating on the movable first magnetic element 550 causes the first magnetic element to accelerate upward toward the third magnetic element 554. The connecting link 546 that is affixed to the movable first magnetic element 550 causes movement of the safety brake element(s) 542 of the safety brake to engage with a guide rail to apply a braking force.

In various embodiments, the sizes of the magnetic elements 550, 552, 554 and the positions thereof may be set to minimize the time for the safety brake element(s) 542 to engage with the guide rail. In one non-limiting example, a short, high current DC pulse can energize the actuator 562 in the event of a car overspeed fault being detected by a speed sensing device (e.g. governor).

Figure 6:
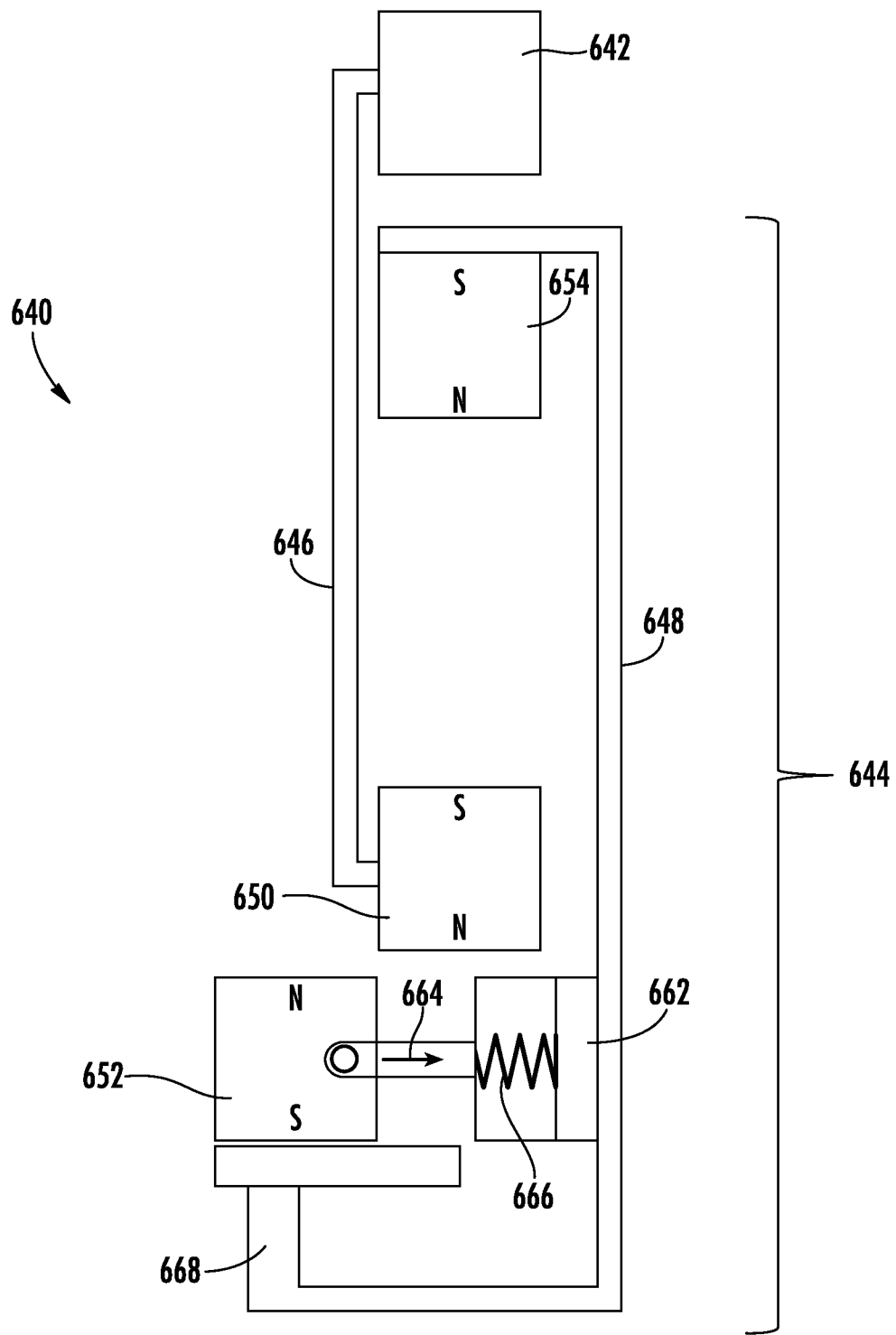
FIG. 6 is a schematic illustration of an overspeed safety system in accordance with an embodiment of the present disclosure.

Turning now to FIG. 6, an overspeed safety system 640 in accordance with an embodiment of the present disclosure is shown. The overspeed safety system 640 is substantially similar to that shown and described above with respect to FIGS. 5A-5C. The overspeed safety system 640 includes a movable first magnetic element 650, a movable second magnetic element 652, and a fixed third magnetic element 654. The movable first magnetic element 650 is fixedly connected to a safety brake element(s) 642 though a connecting link 646, as described above. The magnetic elements 650, 652, 654 are arranged within or respect to a frame 648, as described above, to form an electromechanical actuator 644. The electromechanical actuator 644 includes an actuator 662 (e.g., push or pull solenoid) having a plunger 664 and a biasing element 666, as described above. In this embodiment, however, rather than a rotatable second magnetic element 652, the second magnetic element 652 is translatable or slidable on a support element 668 which may be integral or separate of the frame 648. The translation of the second magnetic element 652 can move the second magnetic element 652 into proximity of the first magnetic element 650, to thus cause a repulsive force to urge the first magnetic element 650 away from the second magnetic element 652, similar in operation to that described above.

Figure 7A:
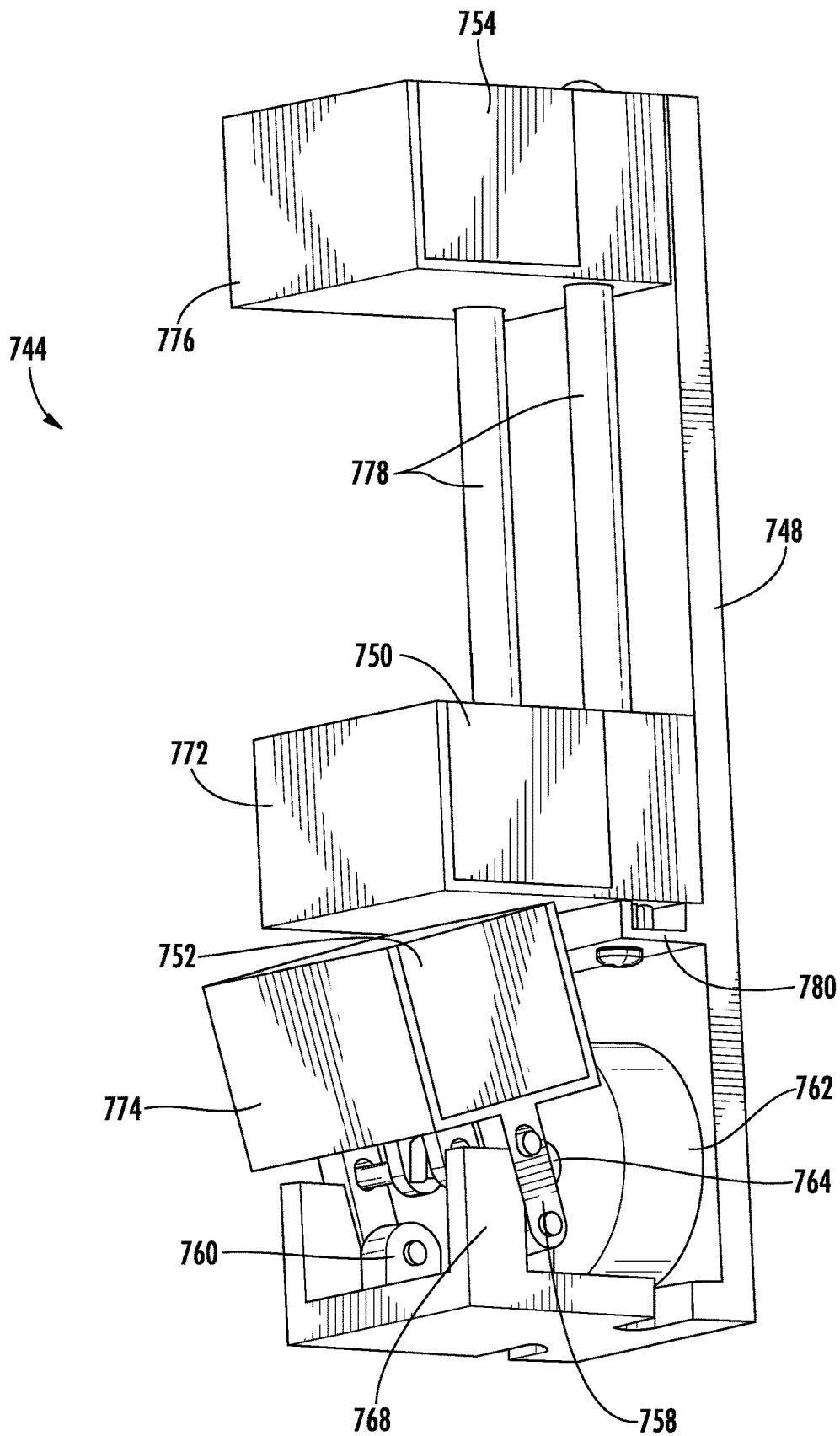
FIG. 7A is an isometric illustration of an electromechanical actuator of an overspeed safety system in accordance with an embodiment of the present disclosure.
Figure 7B:
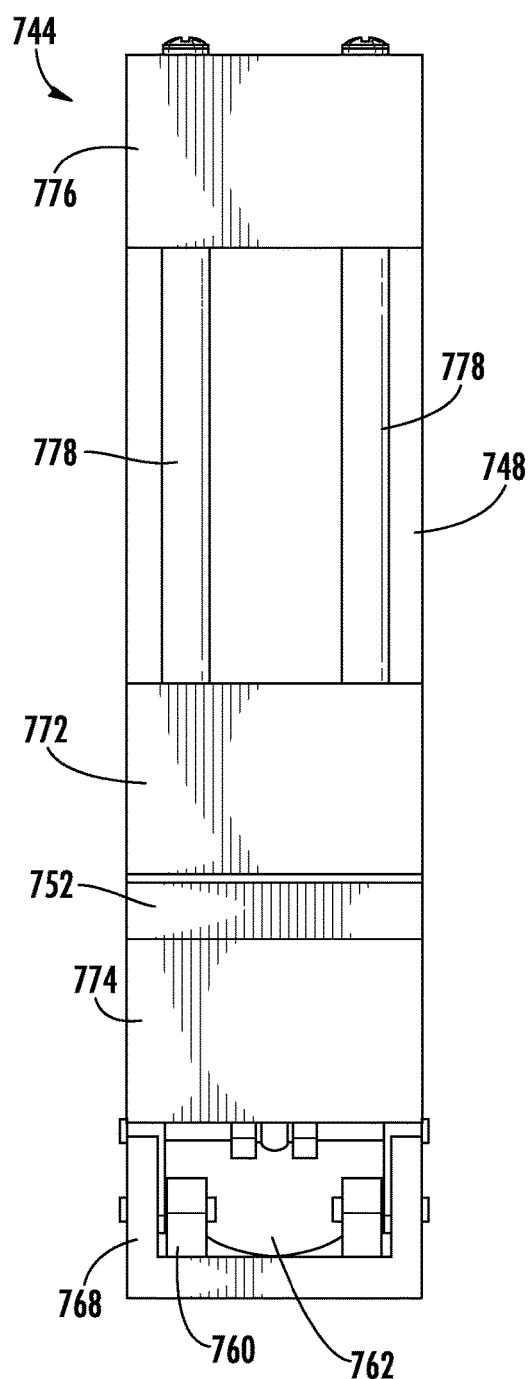
FIG. 7B is a front elevation illustration of the electromechanical actuator of FIG. 7A.
Figure 7C:
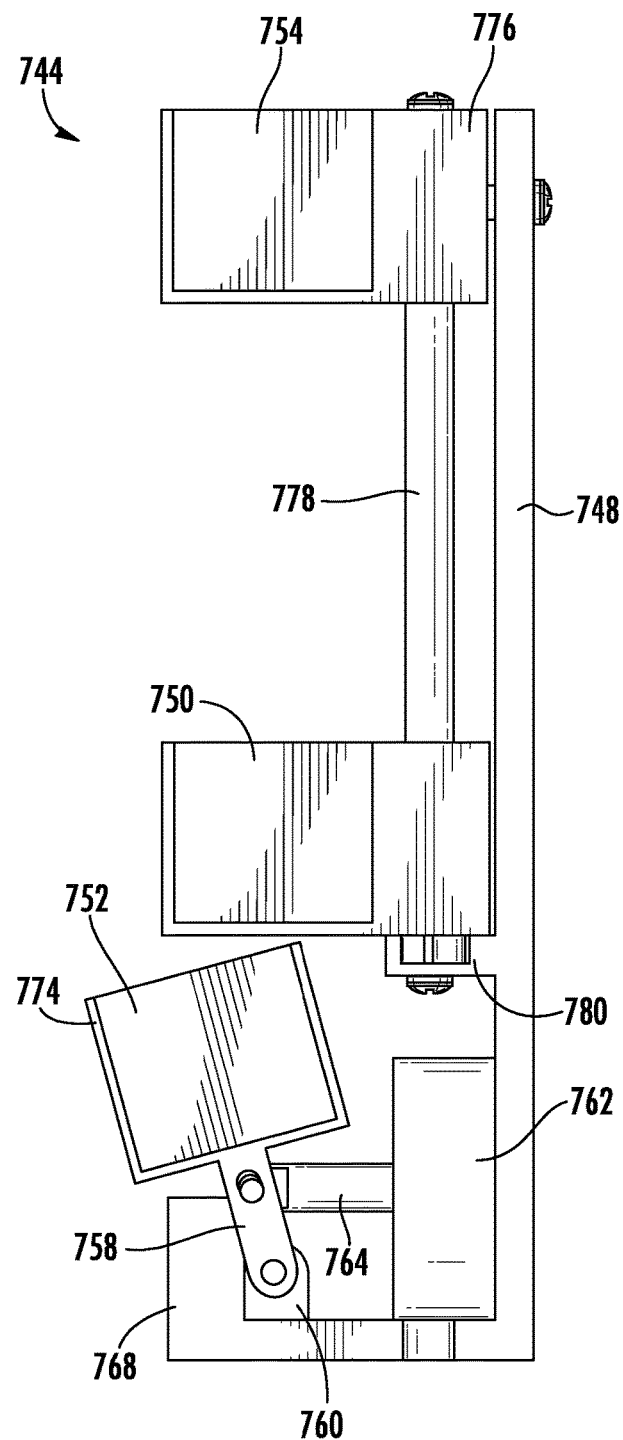
FIG. 7C is a side elevation illustration of the electromechanical actuator of FIG. 7A.

Turning now to FIGS. 7A-7C, an electromechanical actuator 744 in accordance with an embodiment of the present disclosure is shown. The electromechanical actuator 744 may be implemented in an overspeed safety system in accordance with an embodiment of the present disclosure. In some embodiments, the electromechanical actuator 744 is substantially similar to that shown and described above with respect to FIGS. 5A-5C, 6. The electromechanical actuator 744 includes a movable first magnetic element 750, a movable second magnetic element 752, and a fixed third magnetic element 754. The movable first magnetic element 750 may be fixedly connected to a safety brake element(s) (not shown) though a connecting link (not shown), as described above. The magnetic elements 750, 752, 754 are arranged within or respect to a frame 748. The electromechanical actuator 744 includes an actuator 762 (e.g., push or pull solenoid) having a plunger 764 and a biasing element (not shown), as described above. In this embodiment, the second magnetic element 752 similar to the description and operation described with respect to FIGS. 5A-5C.

As shown, each of the magnetic elements 750, 752, 754 may be contained within a respective housing 772, 774, 776.

The housings 772, 774, 776 may be configured to allow for mounting and/or movement of the respective magnetic elements 750, 752, 754. As shown, a first housing 772 contains or houses the first magnetic element 750. The first housing 772 is arranged to move along one or more guides 778 during transition between a first position and a second position (e.g., as described above). When in the first position (as shown in FIGS. 7A-7C), the first housing 772 may rest or contact a stop 780 that is arranged to support and position the first housing 772 relative to the frame 748 during normal operation. Although shown as rods, the guides 778 may be formed as a track or slot along which the first housing 772 may be configured to move (e.g., translate, slide, etc.). Further, although not shown, the first housing 772 may provide for connection to a safety brake element(s) through a connecting link, as described above.

A second housing 774 houses the second magnetic element 752 and is arranged to provide pivotable movement for the second magnetic element 752, as described above. The second housing 774 includes a rotating arm 758 that is pivotable about a pivot 760. As described above, the rotating arm 758 can engage with a support element 768. The support element 768 may be an integral part of the frame 748 and include an angled surface, as described above. The rotating arm 758 of the second housing 774 may be operably connected to the actuator 762 by the plunger 764.

A third housing 776 houses the third magnetic element 754. The third housing 774 may be fixedly connected to the frame 748, through use of welding, fasteners, etc. In other embodiments, the third housing may be integrally formed with or part of the frame 748.

Although shown and described herein with respect to overspeed safety systems connected to traveling components such as elevator cars, such description is not to be limited. For example, the above described systems and processes may be applied equally to counterweights of elevator systems. In some such embodiments, the counterweight overspeed safety systems may be configured to prevent the counterweight from traveling upward or accelerating upward too rapidly and/or to prevent free fall and damage caused by a counterweight overspeed or overacceleration event. In other embodiments, an overspeed travel of the counterweight may be stopped by application of a safety brake of an elevator car that is traveling downward.

Advantageously, embodiments described herein provide overspeed safety systems that can provide controlled stopping of a traveling component in the event of an overspeed event. Embodiments described herein and variations thereof enable elimination of dependence upon friction and/or rail surface conditions to move or operate portions of a safety brake (e.g., wedges). Further, using conventional resetting means, in accordance with some embodiments (e.g., downward movement of elevator car) can eliminate high resetting force issues associated with some prior systems. Further, advantageously, embodiments provided here may be scalable for varying masses of safety brake element(s) by changing various characteristics of the different magnetic elements and associated required motion.

The terminology used herein is for the purpose of describing particular embodiments only and is not intended to be limiting of the present disclosure. The term "about" is intended to include the degree of error associated with measurement of the particular quantity and/or manufacturing tolerances based upon the equipment available at the time of filing the application. As used herein, the singular forms "a", "an" and "the" are intended to include the plural forms as well, unless the context clearly indicates otherwise.

It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

Those of skill in the art will appreciate that various example embodiments are shown and described herein, each having certain features in the particular embodiments, but the present disclosure is not thus limited. Rather, the present disclosure can be modified to incorporate any number of variations, alterations, substitutions, combinations, sub-combinations, or equivalent arrangements not heretofore described, but which are commensurate with the scope of the present disclosure. Additionally, while various embodiments of the present disclosure have been described, it is to be understood that aspects of the present disclosure may include only some of the described embodiments. Accordingly, the present disclosure is not to be seen as limited by the foregoing description, but is only limited by the scope of the appended claims.

What is claimed is:

1. An elevator system comprising:
   a traveling component movable along a guide rail within an elevator shaft; and
   an overspeed safety system comprising:
   a safety brake and an electromechanical actuator operably connected thereto, wherein a safety brake element of the safety brake is operable to engage with the guide rail to stop movement of the traveling component, the electromechanical actuator comprising:
   a frame mountable to the traveling component;
   a first magnetic element movably attached to the frame, the first magnetic element operably connected to the safety brake;
   a second magnetic element movably attached to the frame; and
   a third magnetic element fixedly attached to the frame,
   wherein the second magnetic element is movable from a first position to a second position to urge the first magnetic element from a first position toward a second position, wherein in the second position, the first magnetic element is located proximate the third magnetic element, and wherein as the first magnetic element transitions from the first position to the second position, the safety brake element is actuated into engagement with the guide rail.

2. The elevator system of claim 1, wherein at least one the first magnetic element, the second magnetic element, and the third magnetic element is a permanent magnet.

3. The elevator system of claim 1, further comprising an actuator operably connected to the second magnetic element, wherein operation of the actuator causes the second magnetic element to transition from the first position to the second position.

4. The elevator system of claim 3, wherein the actuator includes a plunger and a biasing element, wherein the plunger is operably connected to the second magnetic element to urge the second magnetic element from the first position toward the second position and the biasing element is configured to urge the second magnetic element toward the first position from the first position.

5. The elevator system of claim 1, further comprising a rotating arm, wherein the second magnetic element is attached to the rotating arm, wherein rotation of the rotating arm causes the second magnetic element to transition between the first position and the second position.

6. The elevator system of claim 5, wherein the rotating arm is moveable through a stroke angle α.

7. The elevator system of claim 6, wherein the stroke angle α is between 10° and 60°.

8. The elevator system of claim 5, further comprising a support element, the support element arrange to support the second magnetic element in the first position, wherein in the first position the rotating arm contacts the support element.

9. The elevator system of claim 8, wherein the support element is integral with the frame.

10. The elevator system of claim 1, further comprising one or more guides within the frame, wherein the first magnetic element is moveable along the one or more guides during transition between the first position and the second position.

11. The elevator system of claim 1, wherein second magnetic element is translatable between the first and second positions.

12. The elevator system of claim 1, further comprising a connecting link fixedly connecting the first magnetic element to the safety brake element.

13. The elevator system of claim 1, wherein the traveling component is an elevator car.

14. The elevator system of claim 1, wherein the traveling component is a counterweight.

15. The elevator system of claim 1, wherein the frame includes a stop, the stop arranged to support the first magnetic element when in the first position.

16. The elevator system of claim 1, wherein at least one of the first magnetic element, the second magnetic element, and the third magnetic element is housed within a respective housing, wherein the respective housing is configured to mount a respective magnetic element to the frame.

17. The elevator system of claim 1, wherein when in the first position of the first magnetic element, the first magnetic element is separated from the third magnetic element by a separation distance $S_d$, and when in the second position of the first magnetic element, the first magnetic element is separate from the third magnetic element by an allowance gap $G_a$ that is less than the separation distance $S_d$.

18. The elevator system of claim 1, wherein, when the second magnetic element is in the second position, a repulsive magnetic force is generated between the first magnetic element and the second magnetic element to urge the first magnetic element toward the third magnetic element.

19. The elevator system of claim 1, wherein, when the first magnetic element is in the second position, an attractive magnetic force is generated between the first magnetic element and the third magnetic element to urge the first magnetic element toward the third magnetic element.

20. The elevator system of claim 1, wherein the safety brake comprises one or more safety brake elements configured to engage with the guide rail when the first magnetic element is transition toward the second position.

* * * * *